Figure 1:
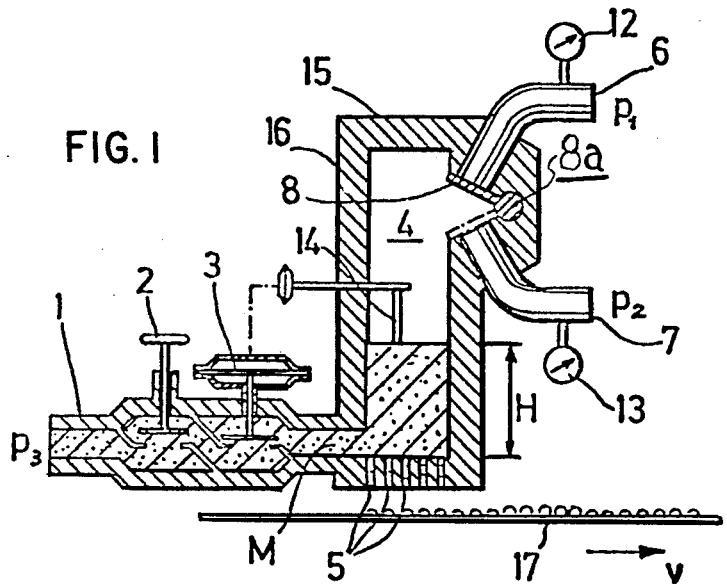

United States Patent [19]

Weinhold

[11] 4,236,882
[45] Dec. 2, 1980

[54] APPARATUS FOR PRODUCING DROPS OR PORTIONS OF LIQUID AND VISCOUS MATERIALS AND FOR PRODUCING PELLETS THEREFROM

[75] Inventor: Otto Weinhold, Vienna, Austria

[73] Assignee: Sandco Ltd., Ottawa, Canada

[21] Appl. No.: 19,242

[22] Filed: Mar. 9, 1979

Related U.S. Application Data

[62] Division of Ser. No. 815,011, Jul. 12, 1977, Pat. No. 4,156,495, and Ser. No. 589,083, Jun. 23, 1975, abandoned.

[30] Foreign Application Priority Data

Jun. 24, 1974 [AT] Austria ................................. 5186/74

[51] Int. Cl.³ ........................ B29F 3/06; B29C 23/00; B29D 31/00
[52] U.S. Cl. ........................................ 425/6; 222/420; 425/10; 425/155; 425/377; 425/404; 425/DIG. 60
[58] Field of Search .................... 264/9, 13, 14, 5; 425/6, DIG. 230, 7, 10, 155, 223, 376 R, 377, 378 R, 403.1, DIG. 60; 222/394, 395, 386.5, 1, 339, 401, 420, 422, 108–110, 64

[56] References Cited

U.S. PATENT DOCUMENTS

| 2,827,078 | 3/1958 | Zies | 137/624.13 |
|---|---|---|---|
| 2,931,067 | 4/1960 | Delaloye et al. | 264/14 |
| 3,208,101 | 9/1965 | Kaiser et al. | 264/13 |
| 3,642,393 | 2/1972 | Ross et al. | 425/6 |
| 3,715,418 | 2/1973 | Privott et al. | 264/13 |
| 3,744,983 | 7/1973 | Jenkins | 425/6 |
| 3,912,431 | 10/1975 | Ellithorpe et al. | 425/6 |
| 3,970,222 | 7/1976 | Duffield | 222/420 |

FOREIGN PATENT DOCUMENTS 584245 9/1959 Canada ................................ 264/13

Primary Examiner—W. E. Hoag
Attorney, Agent, or Firm—Harold L. Stults; Pasquale A. Razzano

[57] ABSTRACT

Apparatus for pelletizing liquid and viscous products. A body of the liquid or viscous material is enclosed within a chamber having discharge orifices or nozzles at the bottom of the body of liquid. There is a body of gas above the liquid which is subjected alternately to increased and decreased gas pressures so that the pressure on the body of liquid is first above and then below atmospheric pressure. That causes the product to be discharged from the orifices in droplets. The droplets are then solidified to form pellets. A predetermined liquid level is maintained within the chamber. The changes in gas pressure are produced by operating a valve which connects the body of gas in the chamber alternately to a suction line and supply line for gas under pressure.

10 Claims, 3 Drawing Figures

APPARATUS FOR PRODUCING DROPS OR PORTIONS OF LIQUID AND VISCOUS MATERIALS AND FOR PRODUCING PELLETS THEREFROM

This a division of application Ser. No. 815,011, filed July 12, 1977 now U.S. Pat. No. 4,156,495, and application Ser. No. 589,083 filed June 23, 1975, now abandoned.

This invention relates to apparatus and systems for producing drops or discrete portions of materials in liquid or viscous forms, and more in particular to producing pellets from such materials.

An object of this invention is to provide improved methods and apparatus for discharging precisely-controlled portions or drops of liquids and viscous materials. A further object is to produce pellets from such portions or drops of the materials. Another object is to provide an improved apparatus and system for producing solidified portions of products from liquid and viscous phases of the materials. A still further object is to provide for the above with apparatus which is efficient, dependable, and adaptable to various conditions of operation and use. These and other objects will be in part obvious and in part pointed out below.

Figure 2:
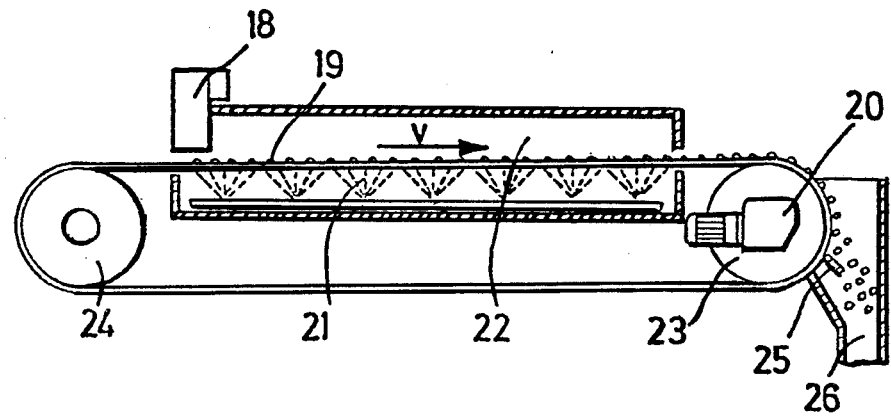
Figure 3:
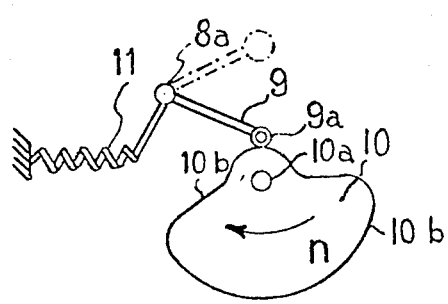

In the drawings:

FIG. 1 is a schematic side-elevation of a system constituting one embodiment of the invention; and, FIG. 2 is a similar view on a reduced scale which includes a showing of the system for cooling the products which are formed in the system in FIG. 1; and, FIG. 3 is a schematic side view of the apparatus used to vary the pressure to which the liquid or viscous material is subjected during the pellet forming process.

Referring to FIG. 1 of the drawings, a unit 18 has a heat-insulated wall structure 16 forming a closed chamber 4 which contains a body of a liquid material to be treated. The space in chamber 4 above the liquid is occupied by a body of gas of controlled pressure. In this embodiment, the body of gas in chamber 4 is nitrogen, although with many materials air may be used. The liquid level in chamber 4 is maintained at H by supplying the liquid from a source $P_3$ through a supply conduit 1, a manual shut-off valve 2 and a liquid-level control valve 3. Valve 3 is open to feed liquid to chamber 4 by the action of a controller 14 of known construction. The bottom wall of chamber 4 has a plurality of orifices or nozzles 5 through which the material being treated is discharged in a precisely controlled manner.

The control of the discharge of the material is effected by varying the pressure of the body of gas in chamber 4. When the gas pressure is increased, the liquid starts to flow from nozzles 5; and, when that pressure is reduced, the flow is stopped and a portion or drop of the material is discharged from each nozzle. Those pressures are varied alternately between super-atmospheric and subatmospheric values so that the liquid first starts to flow from each nozzle and is then drawn back into the nozzle. The arrangement and the cyclic timing are such that a discrete portion or drop of the liquid emerges from the nozzle during each super-pressure impulse and is not drawn back during the next subatmospheric impulse. Hence, for each cycle of super-atmospheric and subatmospheric pressures, each nozzle discharges a single drop of the liquid and the drop falls downwardly onto a steel belt run 17. The action is rapid and continuous, and belt 17 moves to the right at a rate sufficient to provide a continuous single layer of the drops on the belt.

The variations in gas pressure in chamber 4 are caused by connecting the chamber alternately to conduits 6 and 7. Conduit 6 supplies gas to the chamber at a super-atmospheric pressure $P_1$, and conduit 7 withdraws gas from the chamber at a subatmospheric pressure $P_2$. A butterfly valve 8 has positions, the one shown in broken line wherein conduit 6 is open to chamber 4 and the valve closes the end of conduit 7 to chamber 4. In the alternate position of the valve, shown in full lines, conduit 7 is open to chamber 4 and conduit 6 is closed to chamber 4. Hence, in the broken-line position of valve 8, chamber 4 is subjected to super-atmospheric pressure $P_1$, and in the full-line valve portion of the valve, chamber 4 is subjected to subatmospheric pressure, thus producing the cyclic variation in the gas pressure in chamber 4 discussed above.

The operating mechanism for valve 8 is represented schematically in FIG. 3 and comprises an operating arm 9 mounted upon the valve shaft 8a and carrying a cam follower roller 9a which rests upon the cam surface 10b of a cam 10. A tension spring 11 is anchored at one end and has its other end connected to a spring arm 11a which is fixed to shaft 8a. With the cam surface 10b shown, the rotation of cam 10 about the axis of shaft 10a swings arm 9 rapidly up and down between the full-line and broken-line positions shown. When arm 9 is in the full-line position, valve 8 is in its full-line position in which conduit 6 is closed and conduit 7 is open to chamber 4. When arm 9 moves to its broken line position, valve 8 is swung to its broken line position so that conduit 6 is open to chamber 4 and conduit 7 is closed. It is seen that the continuous rotation of cam 10 produces the rapid fluctuations in the gas pressure in chamber 4 as discussed above. It should be noted that the dwells on cam 10 are such as to hold valve 8 in each of its positions for a controlled period of time. In this embodiment, valve 8 is held in the full-line position so as to open the chamber to conduit 7 for a longer period of time than conduit 6 is open to the chamber. The relative times that the two conduits are open to the chamber is varied to provide optimum operating conditions of the particular system and the material being treated. As indicated above, the system and method disclosed are such that a drop or portion of the liquid is discharged from each nozzle 5 when arm 9 and valve 8 are through the operating cycle represented in the drawing. The discharging of the liquid from chamber 4 opens valve 3 sufficiently to maintain the desired liquid level in the chamber. Gages 12 and 13 indicate the gas pressures in the respective conduits 6 and 7.

Referring to FIG. 2, the complete system of FIG. 1 is represented at 18, and belt 17 is the upper run of an endless belt 19, which is mounted upon a pair of pulleys 23 and 24. Belt 19 is driven by an electric motor and gear reduction unit 20 through the shaft of pulley 23. The material portions are cooled by a water or brine spray 21 in a tunnel 22 directed onto the bottom of belt run 17. As the portions reach the right-hand end of belt 17, they are completely solidified as pellets and are pealed from the belt by the bending of the belt as it passes around the pulley. The pellets fall into a hopper 26, and a doctor blade 25 cleans the belt, and insures that all of the pellets are discharged.

The invention contemplates that the drops or portions of the material can be solidified in various ways, for example, solely by contact with air or by direct contact with a liquid. Also, the endless belt can be replaced by a rotating plate. The material may be of a type which is solidified by a chemical reaction or by crystallization. It should be noted that in the present embodiment, the body of the liquid contacts only the fixed walls of chamber 4 and the fixed nozzles, and the valve 8 contacts only the gas. That avoids many problems which are encountered with some systems which have been developed for the same and similar uses.

The material treated is understood to be various liquids which are materials having substantially definite volume but no definite form. Particularly, the liquids form droplets when a small portion is discharged into the atmosphere or another fluid for solidification, and which have been termed "viscous materials". In the illustrative embodiment, the material is discharged through open nozzles into the ambient atmosphere, and flows from the chamber whenever the pressure in chamber 4 is above the atmospheric pressure; and, it flows from the nozzles back into the chamber whenever the pressure within the chamber is below the atmospheric pressure. That is, the successive cycles of pressure variations in the body of gas within chamber 4 is between a value greater than the predetermined pressure at the discharge ends of the nozzles so that the liquid flows outwardly from the chamber, and a value below that predetermined pressure, so that the flow is from the nozzles back into the chamber.

The maintenance of the fixed liquid also maintains a fixed volume of air in chamber 4, and the size and shape of the chamber does not vary during operation. Hence, the cyclic opening of conduits 6 and 7 to the chamber produces a uniform wave motion in the gas movement in the chamber. That in turn produces identical cycles of the pressures exerted on the surface of the body of the liquid, thus insuring the uniform liquid discharge and withdrawal actions within each of the nozzles during each cycle. The fluid-to-fluid contact between the gas and liquid causes the pressures exerted upon the surface of the liquid by the gas to be distributed, so that those pressures do not produce a horizontal wave motion in the liquid in the vicinity of the nozzles. Hence, the pressure variations produce only the desired flow into each of the nozzles and the vertical movements within the nozzles.

The size of the material portions which drop from the nozzles is controlled by varying the gas pressure in conduit 6 and varying the effective time of the cycle during which conduit 6 is open to chamber 4. Increasing either that pressure or that effective time acts to increase the size of those material portions. It has been indicated above that the material in the nozzles tends to move back into chamber 4 when the chamber is connected to conduit 7 and closed to conduit 6. When the production of pellets is discontinued while a body of the material is in chamber 4, valve 8 is moved to the full-line position of FIG. 1 so as to open conduit 7 to the chamber, and that withdraws the material from the nozzles and prevents leakage of the material from the chamber.

The invention contemplates that there will be modifications of the construction and other embodiments within the scope of the claims. For example, in the illustrative embodiment conveyor 19 may be removed so that the material portions drop through air and are solidified while dropping, and the pellets are collected in a hopper. In such case, the solidifying can be by an internal reaction in the material or by air cooling. The material portions can also be dropped into a body of liquid, when appropriate.

What is claimed is:

1. Apparatus for producing discrete drops of a liquid material, comprising the combination of, means forming a chamber closed on all sides for holding a body of the liquid material and a body of gas above the liquid level, nozzle means through which said material can be dispensed in a controlled manner from said chamber against a predetermined pressure, means connected to said chamber forming a source of pressurized gas at a pressure greater than said predetermined pressure and suction means for gas at a pressure less than said predetermined pressure, said pressurizing gas being adapted to elevate the pressure of said body of gas sufficiently to cause said material to be discharged through said nozzle means and said suction means being effective to reduce the pressure of said body of gas sufficiently to prevent the discharge of material through said nozzle means and cause the liquid to move back into the nozzle means, and cyclic operating means for producing a continuous series of cycles each of which comprises a first step during which said pressurizing gas is connected to said body of gas and causes a controlled portion of the material to be discharged through said nozzle means and a second step which connects said suction means to said body of gas and reduces the pressure of said body of gas sufficiently to stop the flow of material through said nozzle means.

2. Apparatus as defined in claim 1 in which said cyclic means includes a single time-controlled valve for connecting said body of gas alternately to said pressurized gas and said suction means.

3. Apparatus as defined in claim 2 wherein said valve is formed by a hinged member, and cam means operating said hinged member.

4. Apparatus as defined in claim 3 which includes means to maintain the level of the material in said chamber, including means to determine said level and an intake control valve actuated thereby.

5. Apparatus as defined in claim 4 which includes an endless conveyor system having a belt run beneath said nozzle means to receive the individual portions extruded through the nozzles.

6. Apparatus as defined in claim 5 which includes means to spray a cooling liquid onto the underside of said belt.

7. In apparatus for producing discrete drops of liquid material, the combination of, means forming a closed chamber having a plurality of fixed discharge nozzles through which liquid material being treated can be discharged into a predetermined space, separate means to supply liquid material to said chamber and to maintain a body of the material at a substantially constant level in said chamber above the level of said nozzles with a body of gas in the upper portion of said chamber, and means to produce successive cycles of pressure variations in said body of gas through a range between a superatmospheric pressure relative to the pressure in said space and a subatmospheric pressure relative to the pressure in said space thereby to exert fluid-to-fluid pressures from the gas to the body of material, said pressures being such that a stream of the material is forced to flow from each of said nozzles during each time in each cycle when said superatmospheric pressure is produced and with a portion of the liquid material being withdrawn back from each nozzle toward said chamber during the time in each cycle when said subatmospheric pressure is produced, whereby a portion of the liquid material which flows from each of said nozzles is disconnected from the body of liquid material in said chamber and falls from the discharge end of the nozzle.

8. The apparatus as described in claim 7 wherein said means to produce successive cycles of pressure variations comprises means constituting a source of gas at a super-atmospheric pressure, means constituting a source of gas at sub-atmospheric pressure, valve means operated to connect said sources of gas alternately to said chamber, and means to operate said valve.

9. The apparatus as described in claim 8 wherein said means to operate said valve means comprises a rotary cam and a cam follower operatively connected to said valve means.

10. An apparatus for producing discrete drops of liquid material comprising means for confining a body of liquid material having a top surface within a closed space, said means having a discharge opening formed therein to which said material is exposed below said top surface and through which the material will flow into a discharge zone, means for maintaining a body of gas within said space having fluid-to-fluid contact with said body of material along said top surface, and means for producing successive cycles of pressure variations in said body of gas, including means for first delivering during each of said cycles additional gas to said body of gas to increase the pressure of the body of gas above the pressure which is at the discharge zone of said opening for a period of time sufficient to cause a specific quantity of the material to be discharged from said opening and from a drop thereof, and means for discharging gas from said body of gas, during each of said cycles and after operation of said pressure increasing means, to reduce said pressure below the pressure at said discharge zone to cause the material in said opening to move back from said drop into said space, whereby said drop is disconnected from the material at said opening.

* * * * *